(12) United States Patent
Matsubara et al.

(10) Patent No.: US 12,347,860 B2
(45) Date of Patent: Jul. 1, 2025

(54) NEGATIVE ELECTRODE ACTIVE MATERIAL FOR AQUEOUS SECONDARY BATTERY, NEGATIVE ELECTRODE FOR AQUEOUS SECONDARY BATTERY, AND AQUEOUS SECONDARY BATTERY

(71) Applicant: Panasonic Intellectual Property Management Co., Ltd., Osaka (JP)

(72) Inventors: Kenji Matsubara, Osaka (JP); Masanobu Takeuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 539 days.

(21) Appl. No.: 17/795,680

(22) PCT Filed: Dec. 1, 2020

(86) PCT No.: PCT/JP2020/044693
§ 371 (c)(1),
(2) Date: Jul. 27, 2022

(87) PCT Pub. No.: WO2021/152998
PCT Pub. Date: Aug. 5, 2021

(65) Prior Publication Data
US 2023/0058362 A1 Feb. 23, 2023

(30) Foreign Application Priority Data
Jan. 31, 2020 (JP) .................. 2020-015216

(51) Int. Cl.
*H01M 4/583* (2010.01)
*H01M 4/02* (2006.01)
(Continued)

(52) U.S. Cl.
CPC ....... *H01M 4/583* (2013.01); *H01M 10/0568* (2013.01); *H01M 10/0569* (2013.01);
(Continued)

(58) Field of Classification Search
CPC ............. H01M 4/583; H01M 10/0568; H01M 10/0569
See application file for complete search history.

(56) References Cited

U.S. PATENT DOCUMENTS

2017/0373351 A1 12/2017 Kawai et al.
2018/0123171 A1 5/2018 Takechi et al.
(Continued)

FOREIGN PATENT DOCUMENTS

CN 102903921 A 1/2013
CN 103043641 A 4/2013
(Continued)

OTHER PUBLICATIONS

International Search Report dated Feb. 16, 2021, issued in counterpart International Application No. PCT/JP2020/044693 (2 pages).

*Primary Examiner* — Sarah A. Slifka
(74) *Attorney, Agent, or Firm* — WHDA, LLP

(57) ABSTRACT

Provided is a negative electrode active material that is applied in an aqueous secondary battery in which is used an aqueous electrolyte containing water and a lithium salt. The negative electrode active material contains hardly-graphitizable carbon, and the hardly-graphitizable carbon has a C—F bond group on the surface thereof. In an XPS spectrum obtained through X-ray photoelectron spectroscopy, when the peak intensity near 688 eV originating from C—F bonds of the hardly-graphitizable carbon is denoted by I688eV, the peak intensity near 284 eV originating from C—C bonds is denoted by I284eV, a ratio of the peak intensity I688eV to the peak intensity I284eV (value of I688eV/I284eV) is
(Continued)

denoted by X, and the BET specific surface area (m2/g) is denoted by Y, the X and Y satisfy Y<(−0.3X+3.75), 0.1≤X≤5, and Y≥2.

13 Claims, 1 Drawing Sheet

(51) Int. Cl.
*H01M 10/0568* (2010.01)
*H01M 10/0569* (2010.01)

(52) U.S. Cl.
CPC .................. *H01M 2004/021* (2013.01); *H01M 2300/0028* (2013.01)

(56) References Cited

U.S. PATENT DOCUMENTS

| | | |
|---|---|---|
| 2019/0044190 A1 | 2/2019 | Yamada et al. |
| 2019/0088948 A1 | 3/2019 | Tojigamori et al. |
| 2022/0173434 A1 | 6/2022 | Matsubara et al. |

FOREIGN PATENT DOCUMENTS

| | | |
|---|---|---|
| JP | 2003-59527 A | 2/2003 |
| JP | 2018-73819 A | 5/2018 |
| JP | 6423453 B2 | 11/2018 |
| JP | 2019-57359 A | 4/2019 |
| WO | 2016/114141 A1 | 7/2016 |
| WO | 2017/122597 A1 | 7/2017 |
| WO | 2020/195092 A1 | 10/2020 |

NEGATIVE ELECTRODE ACTIVE MATERIAL FOR AQUEOUS SECONDARY BATTERY, NEGATIVE ELECTRODE FOR AQUEOUS SECONDARY BATTERY, AND AQUEOUS SECONDARY BATTERY

CROSS-REFERENCE TO RELATED APPLICATION

This application is a National Phase Application filed under 35 U.S.C. 8371 of International Application No. PCT/JP2020/044693 filed on Dec. 1, 2020 which claims the benefit of priority under 35 U.S.C. § 119 (a) of Japanese Patent Application No. 2020-015216 filed in Japan on Jan. 31, 2020, the contents of which are incorporated herein by reference.

TECHNICAL FIELD

The present disclosure relates to a negative electrode active material for an aqueous secondary battery, a negative electrode for an aqueous secondary battery, and an aqueous secondary battery.

BACKGROUND

As secondary batteries with a high output and a high energy density, lithium-ion secondary batteries are widely used that include a positive electrode, a negative electrode, and an electrolyte liquid and perform charge and discharge by allowing lithium ions to travel between the positive electrode and the negative electrode. In the conventional secondary batteries, an organic solvent-based electrolyte liquid is used for achieving the high energy density.

However, organic solvents are generally flammable, and have an important problem of ensuring safety. In addition, organic solvents have a lower ion conductivity than aqueous solutions, and have a problem that the rapid charge-discharge characteristics are insufficient.

In view of such problems, a secondary battery has been studied in which an electrolyte liquid containing water (hereinafter, sometimes referred to as an aqueous electrolyte liquid) is used. For example, Patent Literature 1 and Patent Literature 2 propose a use of an aqueous solution, as an aqueous electrolyte liquid of a secondary battery, containing an alkaline salt at a high concentration. Patent Literature 3 proposes a use of an aqueous electrolyte liquid in which an organic carbonate is added to an aqueous solution containing an alkaline salt at a high concentration. Patent Literature 4 proposes a secondary battery including a negative electrode, a positive electrode, and an aqueous electrolyte liquid, in which the negative electrode includes a composite of a negative electrode active material and polytetrafluoroethylene.

CITATION LIST

Patent Literature

Patent Literature 1: JP 6423453 B
Patent Literature 2: WO 2017/122597 A
Patent Literature 3: JP 2018-73819A
Patent Literature 4: JP 2019-57359 A

SUMMARY

The conventional aqueous secondary batteries have a problem that only low charge-discharge efficiency can be obtained.

An aspect of the present disclosure is a negative electrode active material, for an aqueous secondary battery, to be applied to an aqueous secondary battery in which an aqueous electrolyte liquid is used that contains water and a lithium salt. The negative electrode active material includes non-graphitizable carbon, and the non-graphitizable carbon has a surface having a C—F bond group, and has a ratio of a peak intensity $I_{688eV}$ to a peak intensity $I_{284eV}$ as an $I_{688eV}/I_{284eV}$ value represented by X in an X-ray photoelectron spectroscopy (XPS) spectrum obtained by XPS measurement wherein the peak intensity $I_{688eV}$ represents a peak intensity in a vicinity of 688 eV derived from a C—F bond, and the peak intensity $I_{284eV}$ represents a peak intensity in a vicinity of 284 eV derived from a C—C bond, and the non-graphitizable carbon has a BET specific surface area ($m^2/g$) represented by Y and X and Y satisfy $Y < -0.3X + 3.75$, $0.1 \leq X \leq 5$, and $Y \geq 2$.

Furthermore, an aspect of the present disclosure is a negative electrode, for an aqueous secondary battery, including the negative electrode active material for an aqueous secondary battery.

Furthermore, an aspect of the present disclosure is an aqueous secondary battery including the negative electrode for an aqueous secondary battery, a positive electrode, and an aqueous electrolyte liquid containing water and a lithium salt.

According to the present disclosure, the charge-discharge efficiency of the aqueous secondary battery can be improved.

DESCRIPTION OF EMBODIMENTS

Figure 1:
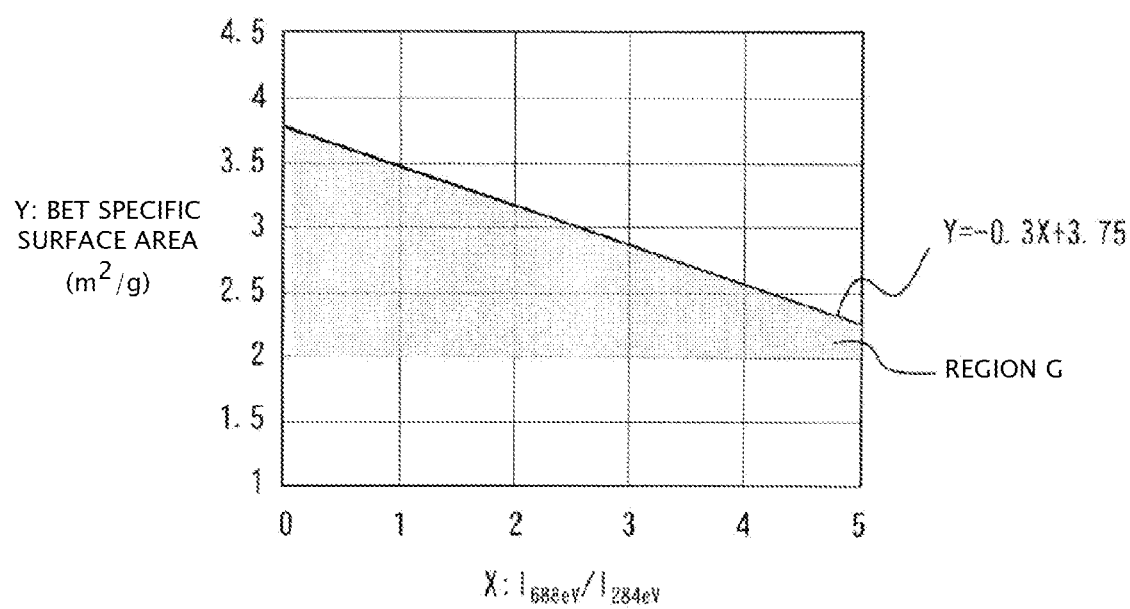
FIG. 1 is a graph showing a relation between the $I_{688eV}/I_{284eV}$ value (X) and the BET specific surface area (Y) in non-graphitizable carbon of the present disclosure.

In an aqueous secondary battery in which an aqueous electrolyte liquid is used that contains water and a lithium salt, use of a carbon material as a negative electrode active material generally promotes reductive decomposition of the aqueous electrolyte liquid on the carbon material, thus leading to inhibition of progress in a charge reaction of the negative electrode active material. However, as a result of intensive studies, the present inventors have found that the reductive decomposition of the aqueous electrolyte liquid can be suppressed and the charge-discharge reaction of the negative electrode active material can be advanced by using, as a negative electrode active material, non-graphitizable carbon having a C—F bond group formed on the surface and by optimizing the absolute amount of the C—F bond group on the non-graphitizable carbon surface and optimizing the BET specific surface area of the non-graphitizable carbon, and that thus the charge-discharge efficiency of the aqueous secondary battery can be improved. Hereinafter, one aspect of the present disclosure will be described.

The negative electrode active material for an aqueous secondary battery as one aspect of the present disclosure includes non-graphitizable carbon, and the non-graphitizable carbon has a surface having a C—F bond group, and has a ratio of the peak intensity $I_{688eV}$ to the peak intensity $I_{284eV}$ ($I_{688eV}/I_{284eV}$ value) represented by X in an X-ray photoelectron spectroscopy (XPS) spectrum obtained by XPS measurement wherein $I_{688eV}$ represents the peak intensity in the vicinity of 688 eV derived from a C—F bond, and $I_{284eV}$ represents the peak intensity in the vicinity of 284 eV derived from a C—C bond, and the non-graphitizable carbon has a BET specific surface area (m²/g) represented by Y, and X and Y satisfy Y<−0.3X+3.75, 0.1≤X≤5, and Y≥2. By using the negative electrode active material for an aqueous secondary battery as one aspect of the present disclosure, the charge-discharge efficiency of the secondary battery can be improved. Although the mechanism of exerting the effect is not sufficiently clear, the following is presumed.

The C—F bond group on the non-graphitizable carbon surface is a surface-modifying group in which fluorine is bonded to non-graphitizable carbon or a functional group present on the non-graphitizable carbon surface, and the C—F bond group is formed by subjecting non-graphitizable carbon to a fluorine treatment described below. Forming the C—F bond group on the non-graphitizable carbon surface can lead to suppression of electrochemical catalytic activity at a defect site (electrochemically active site) on the non-graphitizable carbon surface. The suppression results in restraint of the growth rate of the film that is formed on the non-graphitizable carbon surface by reductive decomposition of the aqueous electrolyte liquid, leading to improvement in the denseness of the film. In addition, an effect can be expected that water molecules in the aqueous electrolyte liquid are moved away from the non-graphitizable carbon surface due to the water repellency of the C—F bond group. However, the C—F bond group on the non-graphitizable carbon surface can also be an irreversible site that traps lithium ions, and therefore an excessively large absolute amount of the C—F bond group causes decrease in the amount of lithium released from the negative electrode active material during discharge. Therefore, by setting the absolute amount of the C—F bond group on the non-graphitizable carbon surface to an appropriate amount, a dense film can be formed, and a decrease in the release amount of lithium due to an increase in irreversible sites can be suppressed, and thus a charge-discharge reaction of the negative electrode active material can be advanced, and the charge-discharge efficiency of the secondary battery can be improved. Specifically, as described above, when the ratio of the peak intensity $I_{688eV}$ to the peak intensity $I_{284eV}$ ($I_{688eV}/I_{284eV}$ value) is represented by X and the BET specific surface area is represented by Y, if X and Y satisfy Y<−0.3X+3.75, 0.1≤X≤5, and Y≥2, the amount of the C—F bond group present on the non-graphitizable carbon surface becomes appropriate from the viewpoint of exhibiting the above effect.

FIG. 1 is a graph showing a relation between the $I_{688eV}/I_{284eV}$ value (X) and the BET specific surface area (Y) in non-graphitizable carbon of the present disclosure. As shown in FIG. 1, a region G filled with gray is a region in which the $I_{688eV}/I_{284eV}$ value (X) and the BET specific surface area (Y) satisfy Y<−0.3X+3.75, 0.1≤X≤5, and Y≥2. The $I_{688eV}/I_{284eV}$ value (X) and the BET specific surface area (Y) in the non-graphitizable carbon of the present disclosure are within the region G. Even if the $I_{688eV}/I_{284eV}$ value (X) satisfies 0.1≤X≤5, when the BET specific surface area (Y) satisfies Y<2, the absolute amount of the C—F bond group on the non-graphitizable carbon surface is so small that a dense film is not formed, and when the BET specific surface area (Y) satisfies Y≥−0.3X+3.75, the absolute amount of the C—F bond group on the non-graphitizable carbon surface is so large that the amount of lithium released due to an increase in irreversible sites is decreased. Even if the BET specific surface area (Y) satisfies Y<−0.3X+3.75 and Y≥2, when the $I_{688eV}/I_{284eV}$ value (X) satisfies 0.1>X, the absolute amount of the C—F bond group on the non-graphitizable carbon surface is so small that a dense film is not formed, and when the $I_{688eV}/I_{284eV}$ value (X) satisfies X>5, the absolute amount of the C—F bond group on the non-graphitizable carbon surface is so large that the amount of lithium released due to an increase in irreversible sites is decreased.

Hereinafter, an embodiment of the aqueous secondary battery according to the present disclosure will be described in detail.

Figure 2:
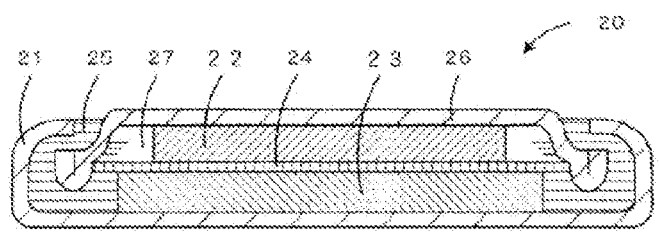
FIG. 2 is a schematic sectional view showing an example of an aqueous secondary battery of the present embodiment.

The shape of the aqueous secondary battery of the present embodiment is not particularly limited, and examples of the shape include coin, button, sheet, stacked, cylindrical, flat, and rectangular shapes. FIG. 2 is a schematic sectional view showing an example of the aqueous secondary battery of the present embodiment. An aqueous secondary battery 20 shown in FIG. 2 includes a cap-shaped battery case 21, a positive electrode 22 provided in the upper part of the battery case 21, a negative electrode 23 provided at a position opposite to the positive electrode 22 with a separator 24 interposed therebetween, a gasket 25 formed with an insulating material, and a sealing plate 26 provided on an opening of the battery case 21 to seal the battery case 21 with the gasket 25. In the aqueous secondary battery 20 shown in FIG. 2, an electrolyte liquid 27 fills a space between the positive electrode 22 and the negative electrode 23. Hereinafter, the electrolyte liquid 27, the positive electrode 22, the negative electrode 23, and the separator 24 will be described in detail.

The electrolyte liquid 27 is an aqueous electrolyte liquid that contains a solvent containing water and contains a lithium salt. The aqueous electrolyte liquid contains water having no flammability, and thus the safety of the aqueous secondary battery 20 can be enhanced. The solvent may be only water, but the content of water in the total amount of the solvent contained in the electrolyte liquid 27 is preferably 50% or more in terms of volume ratio. If the content of water is 50% or more in terms of volume ratio, the safety of the aqueous secondary battery 20 may be enhanced.

The amount of water with respect to the lithium salt contained in the electrolyte liquid 27 is such that the molar ratio of the lithium salt to water is preferably 1:4 or less, more preferably in the range of 1:0.5 to 1:4, and still more preferably in the range of 1:0.5 to 1:3. In a case where the amount of water with respect to the lithium salt contained in the electrolyte liquid 27 is within the above range, for example, the potential window of the electrolyte liquid 27 may be enlarged as compared with the case of the water amount out of the above range, and the voltage applied to the aqueous secondary battery 20 may be further increased.

The electrolyte liquid 27 may contain a solvent other than water. Examples of the solvent other than water include organic solvents such as esters, ethers, nitriles, alcohols, ketones, amines, amides, sulfur compounds, and hydrocarbons. Examples of the solvent other than water may further include halogen-substituted solvents in which at least some hydrogens in the above-described solvents are substituted with halogen atoms such as fluorine. Specifically, organic carbonates are preferable from the viewpoint of, for example, improving the battery characteristics of the aqueous secondary battery, and examples of the organic carbonates include cyclic organic carbonates such as ethylene carbonate, propylene carbonate, vinylidene carbonate, and butylene carbonate, chain organic carbonates such as dimethyl carbonate, methyl ethyl carbonate, and diethyl carbonate, and fluorinated organic carbonates including fluorine as a constitution element such as fluoroethylene carbonate, fluorodimethyl carbonate, and methyl fluoropropionate.

Among the above examples, the cyclic organic carbonates and the fluorinated organic carbonates including fluorine as a constitution element are particularly preferable from the viewpoint of, for example, suppressing self-discharge of the battery. Among the fluorinated organic carbonates in the above examples, fluoroethylene carbonate is preferable. These organic solvents may be used singly or in combination of two or more kinds thereof.

The amount of the organic carbonate with respect to the lithium salt contained in the electrolyte liquid 27 is such that the molar ratio of the lithium salt to the organic carbonate is preferably in the range of 1:0.01 to 1:2.5, and more preferably in the range of 1:0.05 to 1:2. In a case where the amount of the organic carbonate with respect to the lithium salt contained in the electrolyte liquid 27 is within the above range, the battery characteristics of the aqueous secondary battery may be improved as compared with the case of the organic carbonate amount out of the above range.

As the lithium salt, any compound can be used as long as it is dissolved and dissociated in the solvent containing water to provide lithium ions in the electrolyte liquid 27. The lithium salt preferably causes no deterioration of the battery characteristics through its reaction with the materials constituting the positive electrode and the negative electrode. Examples of such a lithium salt include salts with an inorganic acid such as perchloric acid, sulfuric acid, or nitric acid, salts with a halide ion such as a chloride ion or a bromide ion, and salts with an organic anion including a carbon atom in its structure.

Examples of the organic anion constituting the lithium salt include anions represented by the following general formulas (i) to (vi).

$$(R^1SO_2)(R^2SO_2)N^- \quad (i)$$

($R^1$ and $R^2$ are each independently selected from an alkyl group or a halogen-substituted alkyl group. $R^1$ and $R^2$ may be bonded to each other to form a ring.)

$$R^3SO_3^- \quad (ii)$$

($R^3$ is selected from an alkyl group or a halogen-substituted alkyl group.)

$$R^4CO_2^- \quad (iii)$$

($R^4$ is selected from an alkyl group or a halogen-substituted alkyl group.)

$$(R^5SO_2)_3C^- \quad (iv)$$

($R^5$ is selected from an alkyl group or a halogen-substituted alkyl group.)

$$[(R^6SO_2)N(SO_2)N(R^7SO_2)]_2^- \quad (v)$$

($R^6$ and $R^7$ are selected from an alkyl group or a halogen-substituted alkyl group.)

$$[(R^8SO_2)N(CO)N(R^9SO_2)]^{2-} \quad (vi)$$

($R^8$ and $R^9$ are selected from an alkyl group or a halogen-substituted alkyl group.)

In the general formulas (i) to (vi), the number of carbon atoms in the alkyl group or the halogen-substituted alkyl group is preferably 1 to 6, more preferably 1 to 3, and still more preferably 1 to 2. The halogen in the halogen-substituted alkyl group is preferably fluorine. The substitution number of the halogen in the halogen-substituted alkyl group is equal to or smaller than the number of hydrogen atoms in the original alkyl group.

Each of $R^1$ to $R^9$ is, for example, a group represented by the following general formula (vii).

$$C_nH_aF_bCl_cBr_dI_e \quad (vii)$$

(n is an integer of 1 or more, a, b, c, d, and e are integers of 0 or more, and $2n+1=a+b+c+d+e$ is satisfied.)

Specific examples of the organic anion represented by the general formula (i) include bis(trifluoromethanesulfonyl)imide (TFSI; $[N(CF_3SO_2)_2]^-$), bis(perfluoroethanesulfonyl)imide (BETI; $[N(C_2F_5SO_2)_2]^-$), and (perfluoroethanesulfonyl)(trifluoromethanesulfonyl)imide ($[N(C_2F_5SO_2)(CF_3SO_2)]^-$). Specific examples of the organic anion represented by the general formula (ii) include $CF_3SO_3^-$ and $C_2F_5SO_3^-$. Specific examples of the organic anion represented by the general formula (iii) include $CF_3CO_2^-$ and $C_2F_5CO_2^-$. Specific examples of the organic anion represented by the general formula (iv) include tris(trifluoromethanesulfonyl)carbon acid ($[(CF_3SO_2)_3C]^-$) and tris(perfluoroethanesulfonyl)carbon acid ($[(C_2F_5SO_2)_3C]^-$).

Specific examples of the organic anion represented by the general formula (v) include sulfonyl bis(trifluoromethanesulfonyl)imide ($[(CF_3SO_2)N(SO_2)N(CF_3SO_2)]^{2-}$), sulfonyl bis(perfluoroethanesulfonyl)imide ($[(C_2F_5SO_2)N(SO_2)N(C_2F_5SO_2)]^{2-}$), and sulfonyl(perfluoroethanesulfonyl)(trifluoroethanesulfonyl)imide ($[(C_2F_5SO_2)N(SO_2)N(CF_3SO_2)]^{2-}$). Specific examples of the organic anion represented by the general formula (vi) include carbonyl bis(trifluoromethanesulfonyl)imide ($[(CF_3SO_2)N(CO)N(CF_3SO_2)]^{2-}$), carbonyl bis(perfluoroethanesulfonyl)imide ($[(C_2F_5SO_2)N(CO)N(C_2F_5SO_2)]^{2-}$), and carbonyl(perfluoroethanesulfonyl)(trifluoromethanesulfonyl)imide ($[(C_2F_5SO_2)N(CO)N(CF_3SO_2)]^{2-}$).

Examples of organic anions other than the organic anions of the general formulas (i) to (vi) include anions such as bis(1,2-benzenediolate(2-)—O,O')borate, bis(2,3-naphthalenediolate(2-)—O,O')borate, bis(2,2'-biphenyldiolate(2-)—O,O')borate, and bis(5-fluoro-2-olate-1-benzenesulfonate-O,O')borate.

The anion constituting the lithium salt is preferably an imide anion. Specific examples of a preferable imide anion include, in addition to the imide anions exemplified as the organic anions represented by the general formula (i), bis(fluorosulfonyl)imide (FSI; $[N(FSO_2)_2]^-$) and (fluorosulfonyl)(trifluoromethanesulfonyl)imide (FTI; $[N(FSO_2)(CF_3SO_2)]^-$).

The lithium salt having a lithium ion and an imide anion is, for example, preferably lithium bis(trifluoromethanesulfonyl)imide (LiTFSI), lithium bis(perfluoroethanesulfonyl)imide (LiBETI), lithium (perflioroethanesulfonyl)(trifluoromethanesulfonyl)imide, lithium bis(fluorosulfonyl)imide (LiFSI), or lithium (fluorosulfonyl)(trifluoromethanesulfonyl)imide (LiFTI), and more preferably lithium bis(trifluoromethanesulfonyl)imide (LiTFSI), from the viewpoint of, for example, effectively suppressing self-discharge of the battery. These lithium salts may be used singly or in combination of two or more kinds thereof.

Specific examples of other lithium salts include $CF_3SO_3Li$, $C_2F_5SO_3Li$, $CF_3CO_2Li$, $C_2F_5CO_2Li$, $(CF_3SO_2)_3CLi$, $(C_2F_5SO_2)_3CLi$, $(C_2F_5SO_2)_2(CF_3SO_2)CLi$, $(C_2F_5SO_2)(CF_3SO_2)_2CLi$, $[(CF_3SO_2)N(SO_2)N(CF_3SO_2)]Li_2$, $[(C_2F_5SO_2)N(SO_2)N(C_2F_5SO_2)]Li_2$, $[(C_2F_5SO_2)N(SO_2)N(CF_3SO_2)]Li_2$, $[(CF_3SO_2)N(CO)N(CF_3SO_2)]Li_2$, $[(C_2F_5SO_2)N(CO)N(C_2F_5SO_2)]Li_2$, $[(C_2F_5SO_2)N(CO)N(CF_3SO_2)]Li_2$, lithium bis(1,2-benzenediolate(2-)—O,O')borate, lithium bis(2,3-naphthalenediolate(2-)—O,O')borate, lithium bis(2,2'-biphenyldiolate(2-)—O,O')borate, lithium bis(5-fluoro-2-olate-1-benzenesulfonate-O,O')borate, lithium perchlorate (LiClO$_4$), lithium chloride (LiCl), lithium bromide (LiBr), lithium hydroxide (LiOH), lithium nitrate (LiN$_3$), lithium sulfate (Li$_2$SO$_4$), lithium sulfide (Li$_2$S), and lithium hydroxide (LiOH). These lithium salts may be used singly or in combination of two or more kinds thereof.

The electrolyte liquid 27 preferably contains an additive. The additive is added for improving, for example, battery performance, and any conventionally known additive can be used. The additive is particularly preferably a dicarbonyl group-containing compound from the viewpoint of, for example, forming an electrochemically stable film on the negative electrode by the reduction reaction of the electrolyte liquid 27 to effectively suppress a reductive decomposition reaction of the electrolyte liquid 27.

Examples of the dicarbonyl group-containing compound include succinic acid, glutaric acid, phthalic acid, maleic acid, citraconic acid, glutaconic acid, itaconic acid, and diglycolic acid. The dicarbonyl group-containing compound may be an anhydride, and examples of the anhydride include succinic anhydride, glutaric anhydride, phthalic anhydride, maleic anhydride, citraconic anhydride, glutaconic anhydride, itaconic anhydride, and diglycolic anhydride. Among the above compounds, succinic acid, succinic anhydride, maleic acid, maleic anhydride, diglycolic acid, glutaric acid, and the like are preferable from the viewpoint of forming an electrochemically stable film on the negative electrode to effectively suppress a reductive decomposition reaction of the electrolyte liquid 27. Among them, succinic acid and succinic anhydride are preferable. These compounds may be used singly or in combination of two or more kinds thereof.

The content of the additive is, for example, preferably 0.1 mass % or more and 5.0 mass % or less, and more preferably 0.5 mass % or more and 3.0 mass % or less, based on the total amount of the electrolyte liquid 27. If the content of the additive is set within the above range, the reductive decomposition reaction of the electrolyte liquid 27 may be effectively suppressed as compared with the case of the additive content out of the above range.

The positive electrode 22 includes, for example, a positive electrode current collector and a positive electrode mixture layer formed on the positive electrode current collector. As the positive electrode current collector, for example, a foil of a metal electrochemically and chemically stable within the potential range of the positive electrode or a film having such a metal disposed on its surface layer can be used. The form of the positive electrode current collector is not particularly limited. For example, a porous body of the metal, such as a mesh, a punching sheet, or an expanded metal, may be used. As the material of the positive electrode current collector, for example, a known metal can be used that is usable in a secondary battery in which an aqueous electrolyte liquid is used. Examples of such a metal include stainless steel, Al, an aluminum alloy, and Ti. The positive electrode current collector preferably has a thickness of, for example, 3 μm or more and 50 pin or less from the viewpoints of current collectability, mechanical strength, and the like.

The positive electrode mixture layer includes a positive electrode active material. The positive electrode mixture layer may include a binder, a conductive agent, and the like. The positive electrode 22 can be manufactured by, for example, applying a positive electrode mixture slurry including a positive electrode active material, a binder, a conductive agent, and the like to a positive electrode current collector, and drying and rolling the applied film to form a positive electrode mixture layer on the positive electrode current collector.

Examples of the positive electrode active material include lithium-containing transition metal oxides containing lithium (Li) and a transition metal element such as cobalt (Co), manganese (Mn), or nickel (Ni). In addition, examples of the positive electrode active material include transition metal sulfides, metal oxides, lithium-containing polyanion-based compounds including one or more transition metals such as lithium iron phosphate (LiFePO$_4$) and lithium iron pyrophosphate (LiFeP$_2$O$_7$), a sulfur-based compound (Li$_2$S), oxygen, and oxygen-containing metal salts such as lithium oxide. The positive electrode active material is preferably a lithium-containing transition metal oxide, and preferably includes at least one of Co, Mn, or Ni as a transition metal element.

The lithium-containing transition metal oxide may include an additional element other than Co, Mn, and Ni, and for example, may include aluminum (Al), zirconium (Zr), boron (B), magnesium (Mg), scandium (Sc), yttrium (Y), titanium (Ti), iron (Fe), copper (Cu), zinc (Zn), chromium (Cr), lead (Pb), tin (Sn), sodium (Na), potassium (K), barium (Ba), strontium (Sr), calcium (Ca), tungsten (W), molybdenum (Mo), niobium (Nb), and silicon (Si).

Specific examples of the lithium-containing transition metal oxide include Li$_x$CoO$_2$, Li$_x$NiO$_2$, Li$_x$MnO$_2$, Li$_x$Co$_y$Ni$_{1-y}$O$_2$, Li$_x$Co$_y$M$_{1-y}$O$_z$, Li$_x$Ni$_{1-y}$M$_y$O$_z$, Li$_x$Mn$_2$O$_4$, Li$_x$Mn$_{2-y}$M$_y$O$_4$, LiMPO$_4$, and Li$_2$MPO$_4$F (in each chemical formula, M is at least one of Na, Mg, Sc, Y, Mn, Fe, Co, Ni, Cu, Zn, Al, Cr, Pb, Sb, or B, $0<x\le1.2$, $0<y\le0.9$, and $2.0\le z\le2.3$).

The lithium-containing transition metal oxides may be used singly or in combination of two or more kinds thereof. The lithium-containing transition metal oxide preferably includes 80 mol % or more of Ni based on the total amount of the transition metals other than lithium from the viewpoint of increasing the capacity. From the viewpoint of stability of the crystal structure, the lithium-containing transition metal oxide is more preferably Li$_a$Ni$_b$Co$_c$Al$_d$O$_2$ ($0<a\le1.2$, $0.8\le b<1$, $0<c<0.2$, $0<d\le0.1$, and $b+c+d=1$).

As the conductive agent, a known conductive agent can be used that enhances the electroconductivity of the positive electrode mixture layer, and examples of the conductive agent include carbon materials such as carbon black, acetylene black, Ketjenblack, graphite, carbon nanofibers, carbon nanotubes, and graphene. As the binder, a known binder can be used that maintains good contact states of the positive electrode active material and the conductive agent and enhances the adhesiveness of the positive electrode active material and the like to the surface of the positive electrode current collector, and examples of the binder include fluororesins such as polytetrafluoroethylene (PTFE) and polyvinylidene fluoride (PVDF), polyacrylonitrile (PAN), polyimides, acrylic resins, polyolefins, carboxymethyl cellulose (CMC) and its salts, styrene-butadiene rubber (SBR), polyethylene oxide (PEO), polyvinyl alcohol (PVA), and polyvinylpyrrolidone (PVP).

The negative electrode 23 includes, for example, a negative electrode current collector and a negative electrode mixture layer formed on the negative electrode current collector. As the negative electrode current collector, for example, a foil of a metal electrochemically and chemically stable within the potential range of the negative electrode or a film having such a metal disposed on its surface layer can be used. The form of the negative electrode current collector is not particularly limited. For example, a porous body of the metal, such as a mesh, a punching sheet, or an expanded metal, may be used. As the material of the negative electrode current collector, for example, a known metal can be used that is usable in an aqueous secondary battery. Examples of such a metal include Al, Ti, Mg, Zn, Pb, Sn, Zr, and In. These metals may be used singly, or may be used as an alloy or the like of two or more kinds thereof, and the material of the negative electrode current collector is to include at least one such metal as a main component. In the case of including two or more elements, the material is not necessarily required to be alloyed. The negative electrode current collector preferably has a thickness of, for example, 3 μm or more and 50 μm or less from the viewpoints of current collectability, mechanical strength, and the like.

The negative electrode mixture layer includes a negative electrode active material. The negative electrode mixture layer may include a binder, a conductive agent, and the like. As the conductive agent and the binder, ones similar to those on the positive electrode side can be used. The negative electrode 23 can be manufactured by, for example, applying a negative electrode mixture slurry including a negative electrode active material, a binder, a conductive agent, and the like to a negative electrode current collector, and drying and rolling the applied film to form a negative electrode mixture layer on the negative electrode current collector.

The negative electrode active material includes non-graphitizable carbon having a surface having a C—F bond group. Hereinafter, such non-graphitizable carbon is sometimes referred to as surface-modified non-graphitizable carbon. When the surface-modified non-graphitizable carbon has a ratio of the peak intensity $I_{688eV}$ to the peak intensity $I_{284eV}$ ($I_{688eV}/I_{284eV}$ value) represented by X in an XPS spectrum obtained by X-ray photoelectron spectroscopy measurement wherein $I_{688eV}$ represents the peak intensity in the vicinity of 688 eV derived from a C—F bond and $I_{284eV}$ represents the peak intensity in the vicinity of 284 eV derived from a C—C bond, and when the surface-modified non-graphitizable carbon has a BET specific surface area ($m^2/g$) represented by Y, X and Y are to satisfy $Y \leq -0.3X+3.75$, $0.1 \leq X \leq 5$, and $Y \geq 2$, and preferably satisfy $Y \leq -0.3X+3.75$, $0.1 \leq X \leq 2$, and $Y \geq 3$, from the viewpoint of improving the charge-discharge efficiency of the aqueous secondary battery.

The peak intensity $I_{688eV}$ and the peak intensity $I_{284eV}$ in the XPS spectrum measured by X-ray photoelectron spectroscopy are obtained under the following conditions.

Measurement device: PHI Quantera SXM manufactured by ULVAC-PHI, Inc.
X-ray source used: Al-mono (1486.6 eV), 20 kV/100 W
Analysis area: 100 μmφ
Photoelectron take-off angle: 45°
Neutralization condition: neutralization with electrons and floating ions
Measurement range (eV): 1300 to 0
Step (eV): 1.0
Pass E (eV): 280.0
Measurement time (msec/step): 60

The BET specific surface area is obtained under the following measurement conditions.

Measurement device: Autosorb iQ-MP manufactured by Quantachrome Instruments
Predrying (degassing conditions): in vacuum, 100° C., 1 hour The surface-modified non-graphitizable carbon is obtained by subjecting non-graphitizable carbon to a fluorine treatment. The fluorine treatment of non-graphitizable carbon can be performed with, for example, a dry method or a wet method. In the dry method, non-graphitizable carbon is subjected to a fluorine treatment in a gas phase using a gas fluorinating agent. In the wet method, non-graphitizable carbon is subjected to a fluorine treatment in a liquid phase using a liquid fluorinating agent. Among these methods, the dry method is preferable from the viewpoints of simple operation, ease of forming a C—F bond group on the non-graphitizable carbon surface, and low possibility of doping the inside of the non-graphitizable carbon with F.

Examples of the fluorinating agent include fluorine ($F_2$), nitrogen trifluoride, and chlorine trifluoride, and among the fluorinating agents, fluorine ($F_2$) is preferable from the viewpoint of ease of handling. In a case where the fluorine treatment is performed with the dry method, the fluorinating agent may be diluted with a dilution gas such as an inert gas such as a nitrogen gas, a helium gas, a neon gas, an argon gas, or a xenon gas.

Hereinafter, a case will be described in which the non-graphitizable carbon is subjected to a fluorine treatment with the dry method.

In a case where the non-graphitizable carbon is subjected to a fluorine treatment with the dry method, the non-graphitizable carbon is brought into contact with a fluorinating agent gas and thus can be subjected to a fluorine treatment. Examples of the method of bringing non-graphitizable carbon into contact with a fluorinating agent gas include a method in which non-graphitizable carbon is left in a closed atmosphere of a fluorinating agent gas and brought into contact with the fluorinating agent gas (referred to as batch method), and a method in which non-graphitizable carbon is supplied with a fluorinating agent gas and brought into contact with the fluorinating agent gas (flow method).

When brought into contact with a fluorinating agent gas, non-graphitizable carbon is preferably heated from the viewpoint of, for example, enhancing the fluorine treatment efficiency. The heating temperature is, for example, preferably 200° C. or higher and 500° C. or lower, and more preferably 300° C. or higher and 400° C. or lower.

The longer the time during which the non-graphitizable carbon is brought into contact with the fluorinating agent gas is, the higher the peak intensity $I_{688eV}$ derived from a C—F bond is. As the time during which the non-graphitizable carbon is brought into contact with the fluorinating agent gas becomes longer, the BET specific surface area of the surface-modified non-graphitizable carbon subjected to the fluorination treatment becomes smaller. Therefore, the time during which the non-graphitizable carbon is brought into contact with the fluorinating agent gas is to be set to a time such that the $I_{688eV}/I_{284eV}$ value X and the BET specific surface area ($m^2/g$) Y satisfy $Y \leq -0.3X+3.75$, $0.1 \leq X \leq 5$, and $Y \geq 2$. Note that the fluorination treatment of the non-graphitizable carbon decreases the BET specific surface area of the surface-modified non-graphitizable carbon, and therefore the non-graphitizable carbon before the fluorination treatment may have a BET specific surface area ($m^2/g$) Y out of the above range.

In an XPS spectrum obtained by X-ray photoelectron spectroscopy measurement of the surface-modified non-graphitizable carbon, it is preferable that no peak is confirmed in the vicinity of 685 eV (for example, in the range of 683.5 eV to 686.5 eV) derived from a Me-F bond (Me:alkali metal, alkaline earth metal). However, the peak derived from a Me-F bond in an XPS spectrum measured by X-ray photoelectron spectroscopy is confirmed for the surface-modified non-graphitizable carbon before charge and discharge of the secondary battery. This is because after charge and discharge of the secondary battery, a film having a Me-F bond such as LiF may be formed on the surface of the surface-modified non-graphitizable carbon. If surface-modified non-graphitizable carbon having no Me-F bond group on its surface is used, for example, an insulator such as LiF is not present on the surface-modified graphite surface at the time of initial charge, so that local non-uniformity of the current density can be suppressed at the time of charge, and thus a further thin and dense film can be formed. Therefore, contact resistance among surface-modified non-graphitizable carbon can be suppressed, and the battery characteristics such as the output characteristics may be improved.

The peak derived from a Me-F bond in an XPS spectrum measured by X-ray photoelectron spectroscopy is measured under the conditions described below.

Measurement device: PHI Quantera SXM manufactured by ULVAC-PHI, Inc.
X-ray source used: Al-mono (1486.6 eV), 20 kV/100 W
Analysis area: 100 μmφ
Photoelectron take-off angle: 45°
Neutralization condition: neutralization with electrons and floating ions
Element for measurement: F1s
Measurement range (eV): 695 to 675
Step (eV): 0.05
Pass E (eV): 55
Measurement time (msec/step): 60

When the percentage (atom %) of fluorine present on the surface of the surface-modified non-graphitizable carbon is represented by A atom % and the percentage (atom %) of fluorine present in the whole of the surface-modified non-graphitizable carbon is represented by B atom %, the value of A atom %/NB atom % is preferably 3 or more and 30 or less. If the value of A atom %/B atom % is less than 3, the surface-modified non-graphitizable carbon has C—F bond groups on its surface in such a small amount that the denseness of the film formed on the surface may deteriorate, or the surface-modified non-graphitizable carbon has F atoms inside in such a large amount that the number of irreversible sites that trap lithium ions inside the surface-modified non-graphitizable carbon may increase, and therefore the charge-discharge efficiency of the secondary battery may deteriorate as compared with the case where the value of A atom %/B atom % satisfies the above range. If the value of A atom %/B atom % is more than 30, the surface-modified non-graphitizable carbon has C—F bond groups on its surface in such a large amount that the number of irreversible sites that trap lithium ions on the surface may increase, and therefore the charge-discharge efficiency of the secondary battery may deteriorate as compared with the case where the value of A atom %/B atom % satisfies the above range. In order to increase the amount of fluorine present on the surface of the surface-modified non-graphitizable carbon, the fluorine treatment is preferably performed with the above-described dry method.

The percentage of fluorine on the surface of the surface-modified non-graphitizable carbon (A atom %) is a value calculated by X-ray photoelectron spectroscopy measurement. Specifically, the amount of fluorine (atom %), the amount of carbon (atom %), and the amount of oxygen (atom %) are determined by X-ray photoelectron spectroscopy measurement, the percentage of fluorine is calculated based on the total amount thereof that is regarded as 100, and the resulting value is regarded as the percentage of fluorine on the surface of the surface-modified non-graphitizable carbon (A atom %). The percentage of fluorine in the whole of the surface-modified non-graphitizable carbon (B atom %) is a value calculated using the following elemental analyzer. The percentage of fluorine (wt %) in the whole of the surface-modified non-graphitizable carbon is determined with an organic elemental analysis system (XS-2100H manufactured by Mitsubishi Chemical Analytech Co., Ltd.), and then the percentage of carbon (wt %) in the whole of the surface-modified non-graphitizable carbon is determined with an elemental analyzer (JM11 manufactured by J-Science Lab Co., Ltd.). The total of the amount of fluorine (wt %), the amount of carbon (wt %), and the amount of oxygen (wt %) in the whole of the surface-modified non-graphitizable carbon is regarded as 100, and the percentage of fluorine (wt %) and the percentage of carbon (wt %) described above are subtracted to determine the percentage of oxygen (wt %) in the whole of the surface-modified non-graphitizable carbon. The percentage of fluorine (wt %) is converted into the percentage of fluorine (atom %), and the resulting value is regarded as the percentage of fluorine in the whole of the surface-modified non-graphitizable carbon (B atom %).

The surface-modified non-graphitizable carbon preferably has an average particle size (D50) of, for example, 3 μm or more and 20 μm or less. If the average particle size (D50) of the surface-modified non-graphitizable carbon satisfies the above range, the packing density of the negative electrode is improved as compared with the case where the average particle size (D) does not satisfy the above range, and good battery characteristics may be obtained. The average particle size (D50) means the volume average particle size at which the volume integrated value is 50% in a particle size distribution obtained by a laser diffraction scattering method.

The non-graphitizable carbon to be subjected to the fluorine treatment is a carbon material in which fine graphite crystals are arranged in random directions and further graphitization rarely proceeds, and for example, the average lattice spacing (d002) of the (002) plane obtained by X-ray diffraction measurement is 0.37 nm or more, and the half width of the peak in the vicinity of a diffraction angle $2\theta=22.5°$ (for example, from 21.0° to 24.0°) is 5° or more. The peak in the vicinity of a diffraction angle $2\theta=22.5°$ is a peak derived from the (002) plane of the non-graphitizable carbon.

The X-ray diffraction measurement is performed under the conditions described below.

Measurement device: X'PertPRO manufactured by PANalytical
Target/monochrome: Cu/C
Sample state: powder
Tube voltage/tube current: 45 kV/40 mA
Scanning mode: continuous
Step width: 0.01°
Scanning speed: 5 s/step
Slit width (DS/SS/RS): 0.5°/none/0.1 mm
Measurement range: 10° to 120°
Measurement temperature: room temperature
Analysis software: HighScore Plus manufactured by PANalytical
Method of calculating lattice constant: calculation using regression analysis from peak position and Miller indices calculated by local profile fitting analysis The negative electrode active material may include materials usable in negative electrode active materials of conventional lithium-ion secondary batteries in addition to the surface-modified non-graphitizable carbon as long as an effect of the present disclosure is not impaired, and examples of the materials include alloys including a lithium element, metal compounds, such as metal oxides, metal sulfides, and metal nitrides, including a lithium element, and silicon. Examples of the alloys including a lithium element include a lithium-aluminum alloy, a lithium-tin alloy, a lithium-lead alloy, and a lithium-silicon alloy. Examples of the metal oxides including a lithium element include lithium titanate (such as $Li_4Ti_5O_2$). Examples of the metal nitrides including a lithium element include lithium-cobalt nitrides, lithium-iron nitrides, and lithium-manganese nitrides. Sulfur-based compounds may also be exemplified.

The separator 24 is not particularly limited as long as it has functions of lithium-ion permeation and electrical separation between the positive electrode and the negative electrode, and for example, a porous sheet including a resin, an inorganic material, or the like is used. Specific examples of the porous sheet include fine porous thin films, woven fabrics, and nonwoven fabrics. Examples of the material of the separator 24 include olefin-based resins such as polyethylene and polypropylene, polyamides, polyamideimides, and cellulose. Examples of the inorganic material constituting the separator 24 include glass and ceramics such as borosilicate glass, silica, alumina, and titania. The separator 24 may be a stacked body having a cellulose fiber layer and a thermoplastic resin fiber layer such as an olefin-based resin. The separator 24 may be a multilayer separator including a polyethylene layer and a polypropylene layer, and a separator may be used that has a surface to which a material such as an aramid-based resin or a ceramic is applied.

EXAMPLES

Hereinafter, the present disclosure will be further described with reference to Examples, but the present disclosure is not limited to these Examples.

Example 1

[Negative Electrode]

Surface-modified non-graphitizable carbon was prepared by subjecting non-graphitizable carbon to a fluorine treatment. Specifically, first, the non-graphitizable carbon was put into a Ni crucible, the Ni crucible was put in a heating furnace, and a $N_2$ gas (flow rate: 2.7 L/min) was supplied into the heating furnace for 1.5 hours. Thereafter, while the supply of a $N_2$ gas was continued, the temperature in the heating furnace was raised to 300° C. over 3.5 hours. Next, the temperature in the heating furnace was maintained at 300° C., and a mixed gas obtained by mixing a $F_2$ gas (1.9 mol/h) with a $N_2$ gas (flow rate: 2.0 L/min) was supplied into the heating furnace for 2 minutes. Thereafter, the heating in the heating furnace was stopped, and a $N_2$ gas (flow rate: 2.7 L/min) was supplied into the heating furnace to allow the heating furnace to cool, and thus surface-modified non-graphitizable carbon was obtained. The obtained surface-modified non-graphitizable carbon was measured to determine its physical property values. Table 1 summarizes the results.

The surface-modified non-graphitizable carbon (negative electrode active material) and PVDF as a binder were mixed at a solid-content mass ratio of 96:4 in N-methyl-2-pyrrolidone (NMP) to prepare a negative electrode mixture slurry. Next, this negative electrode mixture slurry was applied to a negative electrode current collector made of a copper foil, and the applied film was dried and then rolled with a roller. The resulting product was cut into a predetermined electrode size to obtain a negative electrode. The amount of the applied negative electrode mixture slurry was 32.3 g/m², and the packing density of the negative electrode active material layer was 1.0 gcm⁻³.

[Positive Electrode]

$LiCoO_2$ as a positive electrode active material, carbon black as a conductive agent, and PVdF as a binder were mixed at a mass ratio of 94:3:3 in NMP to prepare a positive electrode mixture slurry. Next, this positive electrode mixture slurry was applied to a positive electrode current collector made of a Ti foil, and the applied film was dried and then rolled with a roller. The resulting product was cut into a predetermined electrode size to obtain a positive electrode. The amount of the applied positive electrode mixture slurry was 65.0 g/cm², and the packing density of the positive electrode active material layer was 2.8 gcm⁻³.

[Aqueous Electrolyte Liquid]

LITFSI, LIBETI, water, dimethyl carbonate (DMC), and fluoroethylene carbonate (FEC) were mixed at a molar ratio of 0.7:0.3:2.0:0.13:0.11 to prepare an aqueous electrolyte liquid having a water volume ratio in the solvent of 68%.

[Test Cell]

A three-electrode cell (test cell) containing the electrolyte liquid was constructed using the negative electrode as a working electrode, the positive electrode as a counter electrode, and Ag/AgCl (3 M NaCl) as a reference electrode.

Example 2

Surface-modified non-graphitizable carbon was prepared in the same manner as in Example 1 except that in the preparation of the surface-modified non-graphitizable carbon, the mixed gas of a $N_2$ gas and a $F_2$ gas was supplied into the heating furnace for 10 minutes. The obtained surface-modified non-graphitizable carbon was measured to determine its physical property values. Table 1 summarizes the results. Then, a test cell was constructed in the same manner as in Example 1 except that this surface-modified non-graphitizable carbon was used as the negative electrode active material.

Comparative Example 1

Non-graphitizable carbon not subjected to a fluorination treatment was used as the negative electrode active material. The non-graphitizable carbon was measured to determine its physical property values. Table 1 summarizes the results. A test cell was constructed in the same manner as in Example 1 using this non-graphitizable carbon as the negative electrode active material.

Comparative Example 2

Surface-modified non-graphitizable carbon was prepared in the same manner as in Example 1 except that in the preparation of the surface-modified non-graphitizable carbon, the temperature in the heating furnace was raised to 400° C. over 4.5 hours, the temperature in the heating furnace was maintained at 400° C., and the mixed gas of a $N_2$ gas and a $F_2$ gas was supplied into the heating furnace for 2 minutes. The obtained surface-modified non-graphitizable carbon was measured to determine its physical property values. Table 1 summarizes the results. Then, a test cell was constructed in the same manner as in Example 1 except that this surface-modified non-graphitizable carbon was used as the negative electrode active material.

Comparative Example 3

Surface-modified non-graphitizable carbon was prepared in the same manner as in Comparative Example 2 except that in the preparation of the surface-modified non-graphitizable carbon, the mixed gas of a $N_2$ gas and a $F_2$ gas was supplied into the heating furnace for 10 minutes. The obtained surface-modified non-graphitizable carbon was measured to determine its physical property values. Table 1 summarizes the results. Then, a test cell was constructed in the same manner as in Example 1 except that this surface-modified non-graphitizable carbon was used as the negative electrode active material.

Cyclic voltammetry (CV) measurement was performed using the test cells of Examples 1 to 2 and Comparative Examples 1 to 3, and the quantity of electricity in oxidation and the quantity of electricity in reduction in the first cycle was measured. Specifically, the X (potential)-Y (current) curve obtained by the CV measurement was converted into an X (time)-Y (current) curve using analysis software attached to an electrochemical measurement device, the current in the X (time)-Y (current) curve was integrated from the start time of the reduction reaction to the start time of the oxidation reaction to calculate the quantity of electricity in reduction (C), and the current in the X (time)-Y (current) curve was integrated from the star time of the oxidation reaction to the start time of the reduction reaction to calculate the quantity of electricity in oxidation (C). In a case where the oxidation reaction did not start at the time of calculating the quantity of electricity in reduction, the current in the X (time)-Y (current) curve was integrated up to the end of the first cycle to calculate the quantity of electricity in reduction (C), and the quantity of electricity in oxidation (C) was regarded as 0. In a case where the reduction reaction did not start at the time of calculating the quantity of electricity in oxidation, the current in the X (time)-Y (current) curve was integrated up to the end time of the first cycle to calculate the quantity of electricity in oxidation (C). Then, the initial efficiency (%) was determined using the following formula.

Initial efficiency (%)=(quantity of electricity in oxidation(C))/(quantity of electricity in reduction (C))×100

The measurement conditions of the cyclic voltammetry are shown below.

Start potential: OCV

First switching potential: −2.950 V vs. Ag/AgCl (3 M NaCl)

(0.288 V with respect to Li)

Second switching potential: −0.238 V vs. Ag/AgCl (3 M NaCl)

(3 V with respect to Li)

Number of cycles: 2 cycles

Sweep rate: 0.5 mV/sec

Measurement temperature: 25° C.

Table 1 shows the initial efficiency values that are obtained by setting the charge-discharge efficiency in the first cycle in Comparative Example 1 to 100 and relatively indicating the charge-discharge efficiency in the first cycle in other Examples and Comparative Examples.

TABLE 1

| | Surface-modified non-graphitizable carbon | | Initial efficiency with respect to that in Comparative Example 1 |
|---|---|---|---|
| | $I_{688eV}/I_{284eV}$ | BET specific, surface area (m²/g) | |
| Example 1 | 8.2 | 3.278 | 113.0 |
| Example 2 | 1.8 | 3.159 | 100.4 |
| Comparative Example 1 | 0 | 4.052 | 100.0 |
| Comparative Example 2 | 0.23 | 3.757 | 99.2 |
| Comparative Example 3 | 2.02 | 3.625 | 59.8 |

In Examples 1 and 2 in which the surface-modified non-graphitizable carbon was used that had an $I_{688eV}/I_{284eV}$ value (X) and a BET specific surface area (Y) within the region where $Y<-0.3X+3.75$, $0.1\leq X\leq 5$, and $Y\geq 2$ were satisfied (the region G shown in FIG. 1), the charge-discharge efficiency was increased as compared with Comparative Examples 1 to 3 in which the negative electrode active material was used that was out of the region G shown in FIG. 1.

REFERENCE SIGNS LIST

20 Aqueous secondary battery
21 Battery case
22 Positive electrode
23 Negative electrode
24 Separator
25 Gasket
26 Sealing plate
27 Electrolyte liquid

The invention claimed is:

1. A negative electrode active material for an aqueous secondary battery, the negative electrode active material to be applied to an aqueous secondary battery in which an aqueous electrolyte liquid is used, the aqueous electrolyte liquid containing water and a lithium salt,
   the negative electrode active material comprising non-graphitizable carbon,
   the non-graphitizable carbon having a surface having a C—F bond group,
   the non-graphitizable carbon having a ratio of a peak intensity $I_{688eV}$ to a peak intensity $I_{284eV}$ as an $I_{688eV}/I_{284eV}$ value represented by X in an X-ray photoelectron spectroscopy (XPS) spectrum obtained by XPS measurement wherein the peak intensity $I_{688eV}$ represents a peak intensity in a vicinity of 688 eV derived from a C—F bond, and the peak intensity $I_{284eV}$ represents a peak intensity in a vicinity of 284 eV derived from a C—C bond, the non-graphitizable carbon having a BET specific surface area (m²/g) represented by Y, X and Y satisfying $Y<-0.3X+3.75$, $0.1\leq X\leq 5$, and $Y\geq 2$.

2. The negative electrode active material for an aqueous secondary battery according to claim 1, wherein the non-graphitizable carbon has a ratio of A atom %/B atom % of 3 or more and 30 or less wherein A atom % represents a percentage of fluorine present on the surface of the non-graphitizable carbon and B atom % represents a percentage of fluorine present in a whole of the non-graphitizable carbon.

3. The negative electrode active material for an aqueous secondary battery according to claim 1, wherein the non-graphitizable carbon has an average particle size (D50) of 3 µm or more and 20 µm or less.

4. A negative electrode for an aqueous secondary battery, the negative electrode to be applied to an aqueous secondary battery in which an aqueous electrolyte liquid is used, the aqueous electrolyte liquid containing water and a lithium salt, the negative electrode comprising the negative electrode active material for an aqueous secondary battery according to claim 1.

5. An aqueous secondary battery comprising: a negative electrode; a positive electrode; and an aqueous electrolyte liquid containing water and a lithium salt, wherein the negative electrode is the negative electrode for an aqueous secondary battery according to claim 4.

6. The aqueous secondary battery according to claim 5, wherein the lithium salt includes a salt having a lithium ion and an imide anion.

7. The aqueous secondary battery according to claim 6, wherein the lithium salt includes lithium bis(trifluoromethanesulfonyl)imide.

8. The aqueous secondary battery according to claim 5, wherein a content of the water with respect to the lithium salt in the aqueous electrolyte liquid is such that a molar ratio of the lithium salt to the water is 1:4 or less.

9. The aqueous secondary battery according to claim 5, wherein the aqueous electrolyte liquid contains an organic carbonate.

10. The aqueous secondary battery according to claim 9, wherein a content of the organic carbonate with respect to the lithium salt in the aqueous electrolyte liquid is such that a molar ratio of the lithium salt to the organic carbonate is in a range of 1:0.01 to 1:2.5, and the content of the water with respect to the lithium salt in the aqueous electrolyte liquid is such that the molar ratio of the lithium salt to the water is in a range of 1:0.5 to 1:4.

11. The aqueous secondary battery according to claim 9, wherein the organic carbonate includes a cyclic organic carbonate.

12. The aqueous secondary battery according to claim 11, wherein the cyclic organic carbonate includes fluorine as a constitution element.

13. The aqueous secondary battery according to claim 12, wherein the cyclic organic carbonate includes fluoroethylene carbonate.

* * * * *